(12) United States Patent
Shah et al.

(10) Patent No.: US 8,879,605 B1
(45) Date of Patent: Nov. 4, 2014

(54) MOBILE STATION TIME REFERENCE THAT IS ADJUSTED BASED ON PROPAGATION DELAY

(75) Inventors: Maulik K. Shah, Overland Park, KS (US); Sachin R. Vargantwar, Macon, GA (US); Maneesh Gauba, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/437,371

(22) Filed: Apr. 2, 2012

(51) Int. Cl.
*H04B 1/00* (2006.01)

(52) U.S. Cl.
USPC ........... 375/141; 375/130; 375/137; 375/140; 375/145; 455/456.1; 455/456.2

(58) Field of Classification Search
None
See application file for complete search history.

(56) References Cited

U.S. PATENT DOCUMENTS

| | | | |
|---|---|---|---|
| 5,577,022 A | 11/1996 | Padovani et al. | |
| 6,188,354 B1 | 2/2001 | Soliman et al. | |
| 6,204,812 B1 | 3/2001 | Fattouche | |
| 6,321,090 B1 | 11/2001 | Soliman | |
| 6,542,743 B1 | 4/2003 | Soliman | |
| 6,549,545 B1 | 4/2003 | Yamamoto et al. | |
| 6,564,057 B1 | 5/2003 | Chun et al. | |
| 6,580,749 B1 | 6/2003 | Miura | |
| 6,775,252 B1 | 8/2004 | Bayley | |
| 7,020,180 B2 | 3/2006 | Challa et al. | |
| 7,236,796 B2 | 6/2007 | Soliman | |
| 7,391,759 B2 | 6/2008 | Wallace et al. | |
| 7,420,947 B2 | 9/2008 | Sendonaris et al. | |
| 7,983,622 B1 | 7/2011 | Vaughan | |
| 8,055,273 B1 | 11/2011 | Rai et al. | |
| 2001/0006514 A1 | 7/2001 | Park | |
| 2002/0065089 A1 | 5/2002 | Soliman | |
| 2003/0008669 A1* | 1/2003 | Stein et al. | 455/456 |
| 2003/0114172 A1 | 6/2003 | Soliman | |
| 2003/0214436 A1 | 11/2003 | Voor et al. | |
| 2004/0131032 A1 | 7/2004 | Sendonaris et al. | |
| 2004/0233874 A1 | 11/2004 | Baker | |
| 2005/0020264 A1 | 1/2005 | Akao et al. | |
| 2006/0025158 A1* | 2/2006 | Leblanc et al. | 455/456.2 |
| 2009/0125630 A1 | 5/2009 | Gogic | |
| 2010/0311420 A1 | 12/2010 | Reza et al. | |
| 2012/0201195 A1* | 8/2012 | Rausch et al. | 370/328 |

FOREIGN PATENT DOCUMENTS

EP 1107483 A1 6/2001

OTHER PUBLICATIONS

Chuck Wheatley, "Self-synchronizing a CDMA cellular network", Wireless Technologies China '99, Conference Proceedings, pp. 37-44 (1999).
"Method and System for Defining Search Windows Based on Mobile Station Location," U.S. Appl. No. 12/019,374, filed Jan. 24, 2008.

* cited by examiner

*Primary Examiner* — Adolf Dsouza

(57) ABSTRACT

A mobile station receives system time information from a source base transceiver station (BTS) in a spread spectrum communication system. The mobile station estimates a distance between the mobile station and the source BTS. The mobile station calculates a propagation delay based on the estimated distance. The mobile station develops a propagation-delay-adjusted time reference based on the system time information and the calculated propagation delay. The mobile station uses the propagation-delay-adjusted time reference to search for a target pseudonoise (PN) offset corresponding to a target BTS in the spread spectrum communication system. The mobile station may be closer to the target BTS than the source BTS.

17 Claims, 5 Drawing Sheets

MOBILE STATION TIME REFERENCE THAT IS ADJUSTED BASED ON PROPAGATION DELAY

BACKGROUND

Spread spectrum communications are commonly used in cellular networks that provide wireless service to mobile stations, such as wireless telephones. Such cellular networks may operate, for example, in accordance with IS-95 CDMA or cdma2000 standards.

The signals transmitted by base transceiver stations (BTSs) in a spread spectrum communication system are spread by a pseudonoise (PN) sequence. For example, in accordance with IS-95 CDMA standards, the pilot signal transmitted by a BTS is spread by a "short" PN sequence at a chipping rate of 1.2288 MHz, and the "short" PN sequence repeats itself every 26.67 milliseconds. With this chipping rate, one "chip" is approximately 0.8138 microseconds.

Each pilot signal transmitted by a spread spectrum communication system may be spread by the same short PN sequence but with a different phase or "PN offset." In this regard, the beginning of a PN sequence used to spread a signal may occur at a particular time offset relative to a reference time (such as the beginning of every even second), according to the system time that is used by the spread spectrum communication system. The "PN offset" of the signal may then correspond to this particular time offset.

In accordance with IS-95 CDMA standards, each PN offset is defined by an index that is an integer in the range of 0 through 511. The actual PN offset is then found by multiplying its index by 64 chips. Thus, a PN offset of "0" means that the PN sequence begins at the reference time. A PN offset of "1" means that the PN sequence begins 64 chips after the reference time. A PN offset of "2" means that the PN sequence begins 128 chips after the reference time, etc. In this way, different pilot signals may be distinguished by their PN offsets.

As noted above, the PN offset of a pilot signal is defined with respect to a reference time according to the system's time. However, when the pilot signal is received by a mobile station, the mobile station may measure a different PN offset. The difference between the PN offset transmitted by a BTS (the nominal PN offset) and the PN offset measured by the mobile station (the measured PN offset) can arise for at least two reasons: (1) there may be a propagation delay between when the pilot signal is transmitted by the BTS and when it is received by the mobile station; and (2) the mobile station's time may not be perfectly synchronized to the system's time.

The propagation delay can be a function of the distance between the BTS and the mobile station. For example, a spread spectrum signal will travel approximately 244 meters in one chip (assuming that one chip is 0.8138 microseconds). Thus, it takes about 6.6 chips for a spread spectrum signal to travel one mile. This means that if the mobile station is trying to detect a pilot signal from a target BTS that is one mile away, the mobile station will measure a PN offset that is 6.6 chips greater than the nominal PN offset of the target BTS's pilot signal (provided that the mobile station's time is perfectly synchronized with the system's time).

However, the mobile station's time may not be perfectly synchronized with the system's time. Typically, the mobile station seeks to synchronize its time with the system's time based on system time information transmitted by a source BTS in the spread spectrum communication system. However, there is a propagation delay between when the source BTS transmits the system time information and when the mobile station receives it, due to the distance between the source BTS and the mobile station. The propagation delay associated with the system time information causes the mobile station's time to lag the system's time, thereby making the PN offsets of pilot signals received by the mobile station appear to be less than they would otherwise.

The net effect of the propagation delays will depend on how, $D_S$, the distance between the mobile station and the source BTS (the source of the system time information used by the mobile station), compares to $D_T$, the distance between the mobile station and the target BTS (the BTS that transmits the target pilot signal being sought by the mobile station). If $D_S$ is equal to $D_T$, then the measured PN offset of the target pilot signal may be equal to its nominal PN offset. If $D_S$ is less than $D_T$, then the measured PN offset of the target pilot signal may be greater than its nominal PN offset. If $D_S$ is greater than $D_T$, then the measured PN offset of the target pilot signal may be less than its nominal PN offset.

Because the PN offset of a pilot signal that is measured by a mobile station can be either greater than or less than the nominal PN offset of the pilot signal, a mobile station may use a search window centered on the nominal PN offset to search for the pilot signal. The search window typically has a width (in chips) that is specified by a width parameter that the mobile station receives from the spread spectrum communication system. In this way, the mobile station may find a target pilot signal so long as the target pilot signal's PN offset at the mobile station is within the range of PN offsets specified by the search window.

OVERVIEW

In a first principal aspect, an exemplary embodiment provides a method for a mobile station. The mobile station receives system time information from a source base transceiver station (BTS) in a spread spectrum communication system. The mobile station estimates a distance between the mobile station and the source BTS. The mobile station calculates a propagation delay based on the estimated distance. The mobile station develops a propagation-delay-adjusted time reference based on the system time information and the calculated propagation delay. The mobile station uses the propagation-delay-adjusted time reference to search for spread spectrum signals transmitted by one or more other BTSs in the spread spectrum communication system.

In a second principal aspect, an exemplary embodiment provides a method for a spread spectrum communication system, wherein the spread spectrum communication system comprises a plurality of BTSs. The spread spectrum communication system serves a mobile station via a source BTS. The spread spectrum communication system maintains an active set for the mobile station, wherein the active set identifies any BTSs of the spread spectrum communication system that have forward traffic channels assigned to the mobile station. The source BTS assigns to the mobile station a forward traffic channel for a call involving the mobile station. It is determined that the active set for the mobile station identifies only the source BTS. In response to determining that the active set for the mobile station identifies only the source BTS, the source BTS transmits location coordinates of the source BTS over the forward traffic channel assigned to the mobile station.

In a third principal aspect, an exemplary embodiment provides a mobile station. The mobile station comprises a transceiver for wireless communication with a spread spectrum communication system, a processor, data storage, and program instructions stored in the data storage. The program instructions are executable by the processor to cause the mobile station to perform functions comprising: (a) receiving, through the transceiver, system time information transmitted by a source BTS in the spread spectrum communication system; (b) estimating a distance between the mobile station and the source BTS; (c) calculating a propagation delay based on the estimated distance; and (d) developing a propagation-delay-adjusted time reference based on system time information transmitted by the source BTS an the calculated propagation delay.

DETAILED DESCRIPTION OF EXEMPLARY EMBODIMENTS

1. Introduction

The inventors have recognized that the propagation delay of spread spectrum signals can be particularly problematic when a mobile station relies on system time information that is transmitted by a relatively distant BTS. The BTS that a mobile station uses as the source of system time information, is typically the BTS that transmits the strongest pilot signal that is received by the mobile station. However, the BTS with the strongest received pilot signal is not necessarily the closest BTS. In some terrains, the strongest pilot signal that a mobile station receives may be from a BTS that is significantly more distant than other BTSs. This may occur, for example, because the more distant BTS has a less obstructed line-of-sight transmission path (e.g., over open water) than that of the BTSs that are closer to the mobile station.

By relying on system time information that is transmitted by a relatively distant BTS, the mobile station's time may significantly lag the actual system time due to the propagation delay associated with the transmission of the system time information to the mobile station. For example, if a BTS is 9.7 miles away from a mobile station, the propagation delay for transmissions from the BTS to the mobile station would be approximately 64 chips. Thus, if the mobile station sets its time based on the system time information transmitted by this BTS, the result could be that the mobile station's time lags the actual system time by approximately 64 chips.

This time lag can cause problems when the mobile station looks for spread spectrum signals from other BTSs. In this regard, the relatively distant BTS may transmit a neighbor list that identifies PN offsets of other BTSs that the mobile station can scan for to identify handoff candidates. For example, the neighbor list may identify PN 4 as a PN offset of a neighboring BTS. However, if the mobile station's time lags the actual system time by 64 chips, then PN 4 may appear to be PN 3 according to the mobile station's time reference (since PN 4 and PN 3 differ by 64 chips). As a result, when the mobile station scans for the PN offsets identified in the neighbor list, the mobile station may miss the PN 4 signal (and potentially other PN offsets in the neighbor list), depending on the signal's propagation delay and the size of the search window that the mobile station uses for the scan.

Figure 1A:
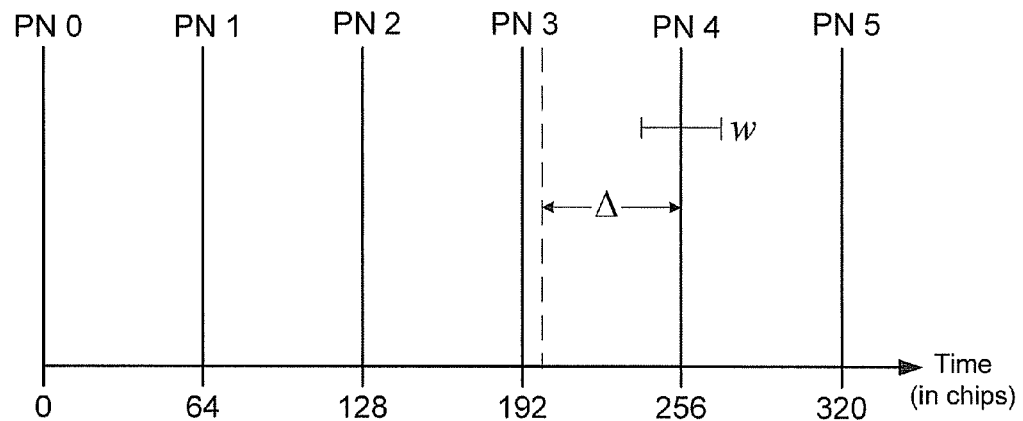
FIG. 1A illustrates nominal PN offsets and an apparent PN offset that is measured using a mobile station's time reference.

FIG. 1A illustrates an example of this problem. In FIG. 1A, the solid vertical lines represent the nominal phases in chips for PN 0 through PN 5. Also shown is a search window having a width of w chips that is centered about the PN 4 line. This search window may be used by a mobile station to scan for a target PN offset of PN 4. The dashed vertical line represents the apparent phase of the PN 4 signal at the mobile station according to the mobile station's time reference. The difference between the nominal phase of the PN 4 signal (i.e., the phase when transmitted from the BTS) and the apparent phase of the PN 4 signal (i.e., the phase that the signal appears to the mobile station) is represented by the $\Delta$ in FIG. 1A. In this example, the apparent phase of the PN 4 signal falls outside of the search window, which means that the mobile station might miss the PN 4 signal. Even if the mobile station were to find the PN 4 signal, the mobile station may regard it as a PN 3 signal because its apparent phase is so close to the nominal phase for PN 3.

In general, a mobile station may miss a target PN offset if $\Delta > w/2$. The difference, $\Delta$, between the nominal phase of a target PN offset and the apparent phase of the target PN offset typically depends on, $P_T$, the propagation delay associated with the target PN offset signal transmitted by the target BTS, and $P_S$, the propagation delay associated with the system time information that the mobile station received from the source BTS. In general, $\Delta = P_S - P_T = (D_S - D_T)/C$, where $D_S$ is the distance between the source BTS and the mobile station, $D_T$ is the distance between the target BTS and the mobile station, and c is the speed of light.

For example, FIG. 1A may correspond to a scenario in which the source BTS is 9.7 miles away from the mobile station and the target BTS that transmits the PN 4 signal is 1.2 miles away from the mobile station. As a result, $P_S$ would be about 64 chips, $P_T$ would be about 8 chips, and $\Delta$ would be about 56 chips. In contrast, a typical width for a search window is 28 chips. Thus, the apparent phase of the PN 4 signal would be well outside of the search window.

In general, if a mobile station sets its time based on system time information from a relatively distant source BTS, the mobile station may miss signals that are transmitted from BTSs that are much closer to the mobile station. Missing signals from such nearby BTSs can, in turn, result in dropped calls because the mobile station might not identify those BTSs as handoff candidates to the network. Alternatively, a mobile station might find a signal from a nearby BTS but might misidentify it. For example, a PN 4 signal may appear to be a PN 3 signal to the mobile station, as described above. In that case, the mobile station may identify the nearby BTS as a handoff candidate to the network, but may identify it as PN 3 instead of PN 4. If the network does not recognize the PN 3 offset as corresponding to a valid neighboring BTS, then the network might not allow a handoff.

To address such problems caused by a mobile station relying on system time information from a relatively distant source BTS, the inventors propose estimating the distance between the mobile station and the source BTS and using this estimated distance to calculate the propagation delay between the source BTS and the mobile station. The calculated propagation delay may then be used to adjust the time reference used by the mobile station. In this way, the contribution of $P_S$ to the phase difference, $\Delta$, between the nominal PN offset and the apparent PN offset at the mobile station may be either reduced or eliminated.

Figure 1B:
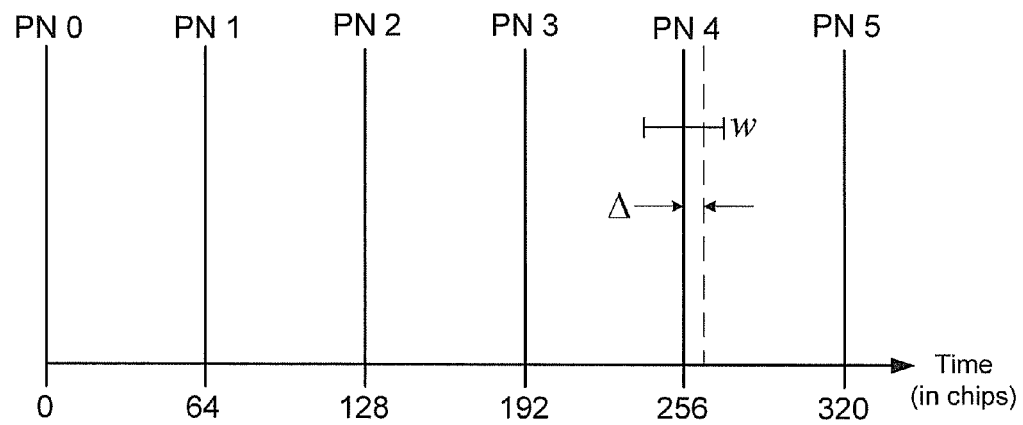
FIG. 1B illustrates nominal PN offsets and an apparent PN offset that is measured using a mobile station's propagation-delay-adjusted time reference, in accordance with an exemplary embodiment.

FIG. 1B illustrates how the apparent phase of the PN 4 signal described above for FIG. 1A may be within the search window when the mobile station's time reference is adjusted based on the propagation delay associated with the source BTS. Following the example of FIG. 1A, in which the mobile station is 9.7 miles away from the source BTS (i.e., $P_S$=64 chips) and is 1.2 miles away from the target BTS (i.e., $P_T$=8 chips), but with the mobile station's time reference adjusted based on $P_S$, FIG. 1B shows that the apparent phase of the PN 4 is now much closer to the nominal phase of the PN 4 signals. Specifically, in the FIG. 1B example, $\Delta = P_T$=8 chips. As a result, the apparent phase of the PN 4 signal, according to the mobile station's adjusted time reference, would be well within a typical search window of w=28 chips.

In order to facilitate estimation of the distance between the source BTS and the mobile station, the source BTS may transmit its location coordinates. The source BTS may transmit this location information in various ways. As one example, the source BTS may transmit its location coordinates in a sync message (i.e., the message that includes system time information), in a neighbor list message, or in some other type of overhead message. As another example, the source BTS may transmit its location coordinates to a mobile station over a forward traffic channel that the source BTS has assigned to the mobile station for a call.

The mobile station may also determine its location, for example, using a satellite-based positioning system, such as the Global Positioning System (GPS), using terrestrial-based signals, a combination of terrestrial-based and satellite-based signals, or in some other manner. Based on its location and the location coordinates from the source BTS, the mobile station may estimate the distance to the source BTS and calculate the propagation delay associated with the estimated distance. The mobile station may then shift its time reference according to the calculated propagation delay.

Instead of location coordinates, the source BTS may transmit other information that may be used to determine distances. For example, the source BTS may perform round trip delay (RTD) measurements for a mobile station and may report the RTD measurements to the mobile station. The mobile station may then calculate the propagation delay associated with the source BTS based on the RTD measurements. Alternatively or additionally, the mobile station may determine the location of the source BTS by consulting a base station almanac or in some other manner.

It is also to be understood that only certain BTSs might be configured to provide location coordinates. For example, the BTSs in a spread spectrum communication system that tend to be used for system time information by mobile stations that are relatively far away (e.g., because of terrain or other reasons) may be flagged as "overshooting" BTSs. These "overshooting" BTSs may then be configured to transmit their location coordinates.

However, an "overshooting" BTS might transmits its location coordinates only under certain conditions. For example, if a mobile station is involved in a soft handoff with an "overshooting" BTS and one or more other BTSs, then the problems that can be caused by an "overshooting" BTS are less of a concern. Thus, in some implementations, an "overshooting" BTS might transmit its location coordinates to a mobile station only when it is the only BTS in the mobile station's active set.

2. Exemplary Spread Spectrum Communication System

Figure 2:
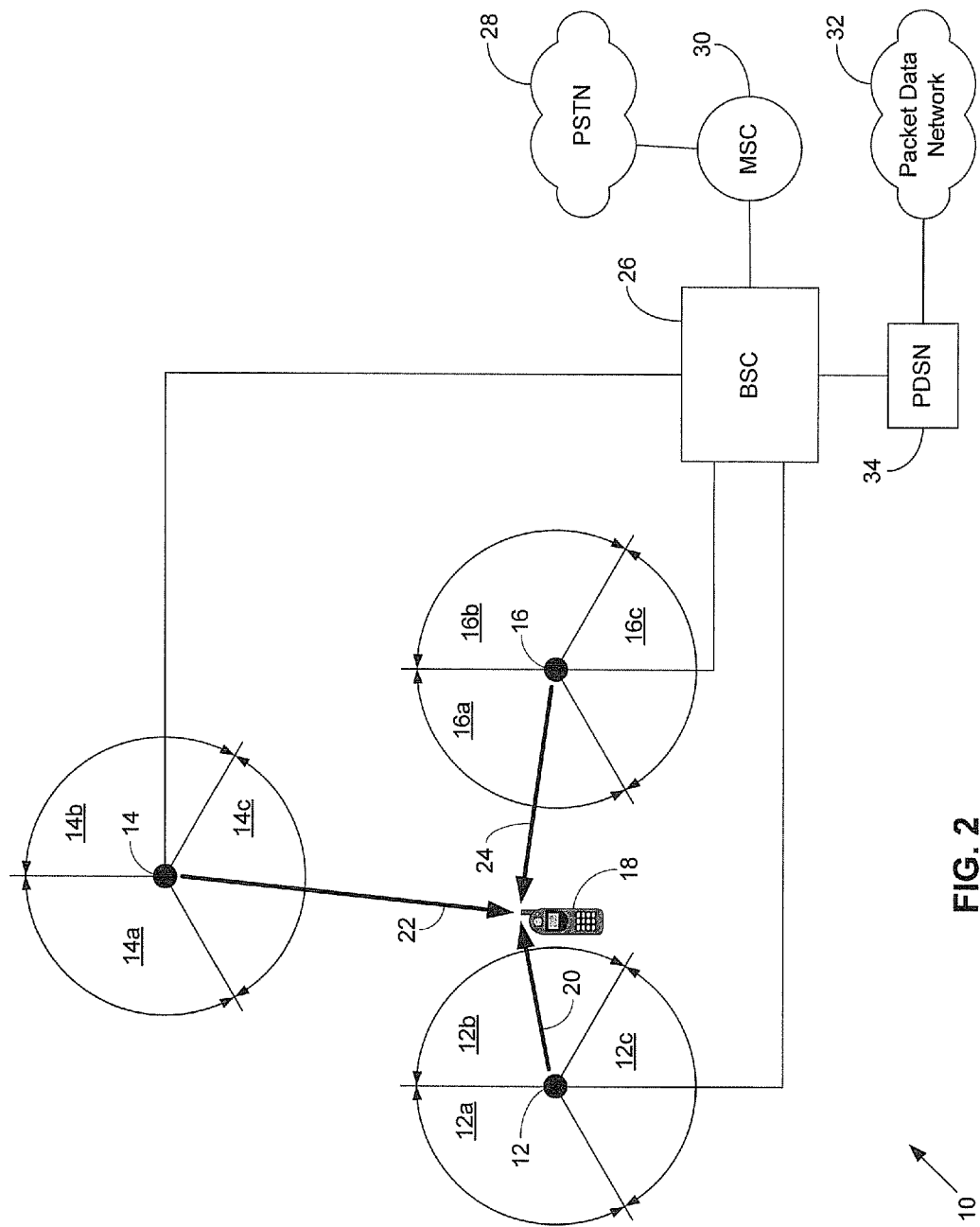
FIG. 2 is a block diagram of a spread spectrum communication system, in accordance with an exemplary embodiment.

FIG. 2 illustrates an exemplary spread spectrum communication system 10 in which exemplary embodiments may be employed. System 10 includes a plurality of base transceiver stations (BTSs), exemplified in FIG. 2 by BTSs 12, 14, and 16. Each BTS may be able to wirelessly communicate with mobile stations, such as mobile station 18.

Mobile station 18 could be a wireless telephone, wireless personal digital assistant, wireless e-mail device, wirelessly-equipped laptop computer, or other wireless communication device.

Each BTS may include a plurality of transmitters and a plurality of receivers (the transmitters and receivers may be integrated into transceivers) for wireless communication with mobile stations, such as mobile station 18. Moreover, each BTS may include directional antennas to define a plurality of sectors. For example, BTS 12 may define sectors 12a, 12b, and 12c, BTS 14 may define sectors 14a, 14b, and 14c, and BTS 16 may define sectors 16a, 16b, and 16c. Although FIG. 2 shows each BTS with three sectors, it is to be understood that a BTS may have a greater or fewer number of sectors. Moreover, it is to be understood that the illustration of sectors in FIG. 2 is schematic only and that FIG. 2 is not intended to illustrate the precise geographic area covered by any sector.

The wireless communication between a mobile station and a sector may occur via one or more forward link channels (for communications from a transmitter in the sector to the mobile station) and one or more reverse link channels (for communications from the mobile station to a receiver in the sector). In the case of IS-95 CDMA, the forward link channels may include a pilot channel, a sync channel, a paging channel, and forward traffic channels, and the reverse link channels may include access channels and reverse traffic channels.

The signals in the forward link channels of a sector may each have a PN offset that is specific for that sector. That way, the mobile station can identify signals from different sectors based on PN offset. For example, BTS 12 may transmit forward link signals 20 in sector 12b, BTS 14 may transmit forward link signals 22 in sector 14c, and BTS 16 may transmit forward link signals 24 in sector 16a. Mobile station 18 may distinguish between forward link signals 20-24 based on their PN offsets.

In one example, forward link signals 20-24 are each spread by the same "short" pseudonoise (PN) sequence, but the beginning of the PN sequence occurs at a different time offset. The time offset between the beginning of the PN sequence and a reference time, according to the "system time" used by system 10, defines the nominal phase of each pilot signal. The nominal phase may be identified as a PN offset index ranging from 0-511. In particular, the PN offset index may be used to determine the nominal phase by multiplying the PN offset index by 64 chips. However, the phases of forward link signals 20-24 at mobile station 18 will differ from their nominal phases due to their respective propagation delays.

The propagation delay for a signal transmitted by a BTS is the time it takes the signal to propagate from the BTS to the mobile station. Thus, forward link signals 20 may be received with a propagation delay associated with the distance between BTS 12 and mobile station 18, forward link signals 22 may be received with a propagation delay associated with the distance between BTS 14 and mobile station 18, and forward link signals 24 may be received with a propagation delay associated the distance between BTS 16 and mobile station 18.

Mobile station 18 may use forward link signals from one or more of sectors 12b, 14c, and 16a, depending on the signal strengths of the pilot signals received by mobile station 18. For example, the pilot signal in forward link signals 22 transmitted by BTS 14 may be the strongest pilot signal received by mobile station 18. In that case, mobile station 18 may lock onto the pilot signal in forward link signals 22 and then receive system time information that is transmitted in a sync channel signal in forward link signals 22. Mobile station 18 may use the system time information to develop a time reference for mobile station 18.

Mobile station 18 may also receive a neighbor list transmitted by BTS 14, for example, over a paging channel in forward link signals 22. The neighbor list may identify the PN offsets of neighboring sectors, such as sector 12b of BTS 12 and sector 16a of BTS 16. Mobile station 18 may search for pilot signals having the PN offsets identified in the neighbor list and/or other pilot signals. If the mobile station 18 finds a sector's pilot signal that has sufficient received signal strength, then mobile station 18 may report the apparent PN offset of the pilot signal to the system 10 as a handoff candidate. If system 10 approves the handoff, then the sector may be used by mobile station 18 for a soft handoff.

For example, if mobile station 18 is involved in a call via sector 14c, mobile station 18 may find that a pilot signal from sector 16a has sufficient signal strength and report its apparent PN offset to system 10. Sector 16a may then be added to an "active set" that is maintained for the mobile station 18 so as to achieve a soft handoff for the call. Because of this soft handoff, mobile station 18 may use forward traffic channels of both sector 14c and sector 16a for the call, and both of sectors 14c and sector 16a may receive reverse link signals from mobile station 18 for the call. Further, if mobile station 18 moves out of the wireless coverage area of sector 14c, then the call may be continued via sector 16a. Thus, being in a soft handoff for a call can advantageously reduce the chances of the call being dropped.

However, if BTS 14 is an "overshooting" BTS that is relatively far away from mobile station 18, then mobile station 18 may misidentify the PN offset of sector 16a or may be unable to find the pilot signal of sector 16a because its apparent PN offset may fall outside of the search window being used by mobile station 18. As a result, sector 16a might not be identified as a handoff candidate by mobile station 18. To overcome this problem, mobile station 18 may adjust its time reference based on the system time information received from BTS 14 in order to compensate for the propagation delay associated with the transmission of that system time information. In some embodiments, mobile station 18 may make this adjustment in response to receiving location coordinates of BTS 14. For example, BTS 14 may transmit its location coordinates to mobile station 18 over a forward traffic channel that BTS 14 assigned for a call involving mobile station 18 in which BTS 14 is the only BTS in the active set of mobile station 18.

BTSs 12, 14, and 16 may be controlled by a base station controller (BSC) 26. For example, BSC 26 may control the use of forward and reverse traffic channels for wireless communication between BTSs 12, 14, and 16 and mobile stations, such as mobile station 18. BSC 26 may also control handoffs between the sectors in its service area (i.e., sectors 12a-c, 14a-c, and 16a-c).

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

3. Exemplary Operation

Figure 3:
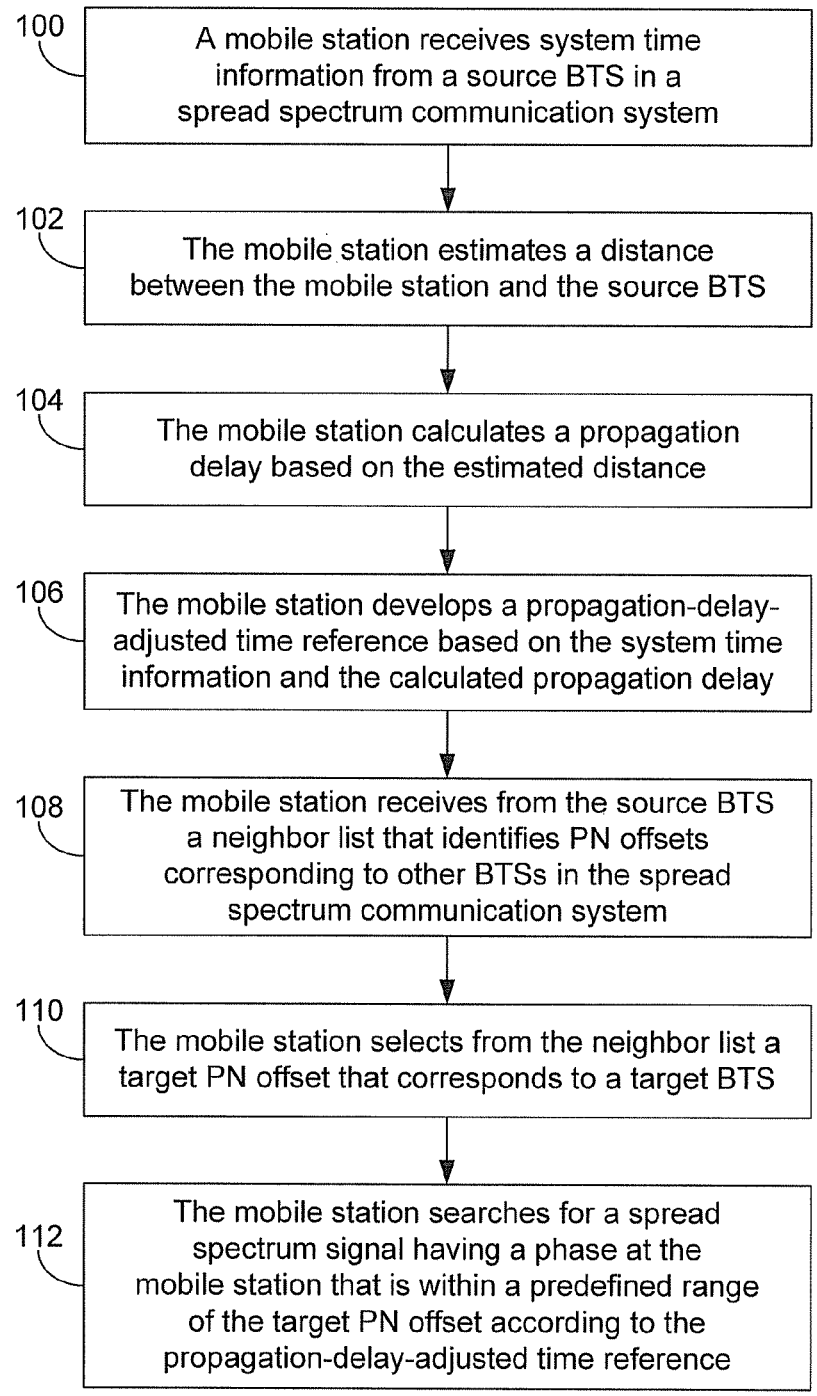
FIG. 3 is a flow chart illustrating a method for a mobile station, in accordance with an exemplary embodiment.

FIG. 3 is a flow chart illustrating an exemplary method for a mobile station in communication with a spread spectrum communication system. For purposes of illustration, the method of FIG. 3 will be discussed with reference to spread spectrum communication system 10 shown in FIG. 2. It is to be understood, however, that other configurations could be used.

The method may begin when a mobile station (e.g., mobile station 18) receives system time information from a source BTS in a spread spectrum communication system (e.g., system 10), as indicated by block 100. The source BTS may be the BTS that transmits the strongest pilot signal received by the mobile station. For example, in the configuration shown in FIG. 2, the strongest pilot signal received by mobile station 18 could be the pilot signal in forward link signals 22 that BTS 14 transmits in sector 14c. In that case, mobile station 18 may then receive a sync channel message in forward link signals 22 in order to receive the system time information.

The system time information relates to a system time used by the spread spectrum communication system, and the mobile station develops a time reference based on the system time information. In this way, the mobile station may be able to synchronize its time with the system time used by the spread spectrum communication system. However, the synchronization is not necessarily perfect because of the propagation delay associated with the time it takes for the system time information to propagate from the source BTS to the mobile station (e.g., from BTS 14 to mobile station 18).

To at least partially compensate for this propagation delay, the mobile station estimates a distance between the mobile station and the source BTS, as indicated by block 102. In some cases, the mobile station may perform this distance estimation for all source BTSs that it encounters. In other cases, the mobile station may perform the distance estimation in response to a trigger condition. For example, mobile station 18 may detect a "flag" or other indication in forward link signals 22 that BTS 14 is an "overshooting" BTS and, thus, could be sufficiently distant that compensation for propagation delay may be warranted. The indication could be in the form of location coordinates that BTS 14 transmits to mobile station 18. In response to receiving the location coordinates of BTS 14, mobile station 18 may determine its own location (e.g., by using GPS and/or other means) and then estimate the distance between mobile station 18 and BTS 14 based on the two locations. Alternatively, mobile station 18 may estimate the distance based on RTD information provided by BTS 14, or mobile station 18 may estimate the distance based on a location of BTS 14 obtained from a base station almanac.

The mobile station then calculates a propagation delay based on the estimated distance, as indicated by block 104. The mobile station also develops a propagation-delay-adjusted time reference based on the system time information that it received from the source BTS and the calculated propagation delay, as indicated by block 106. This may occur in stages. The mobile station may develop an initial time reference based on the system time information that it received from the source BTS in block 100. Subsequently, the mobile station may develop the propagation-delay-adjusted time reference by shifting the initial time reference by the propagation delay calculated in block 104.

At some point, the mobile station receives from the source BTS a neighbor list that identifies PN offsets corresponding to other BTSs in the spread spectrum communication system, as indicated by block 108. With reference to FIG. 2, the neighbor list provided by BTS 14 might identify the PN offsets for sector 12b of BTS 12 and sector 16a of BTS 16 and/or the PN offsets of other sectors.

The mobile station may then select from the neighbor list a target PN offset that corresponds to a target BTS, as indicated by block 110. The mobile station may make the selection based on a priority order of the PN offsets in the neighbor list or based on other criteria. With reference to FIG. 2, the target PN offset may correspond to sector 12b of BTS 12. In the case that the source BTS is an "overshooting" BTS, the target BTS may be closer to the mobile station than the source BTS.

The mobile station then searches for a spread spectrum signal having a phase at the mobile station that is within a predefined range of the target PN offset according to the propagation-delay-adjusted time reference, as indicated by block 112. The predefined range could correspond to a predetermined number of chips in a search window. In the case that the source BTS is an "overshooting" BTS, the propagation delay calculated in block 104 may be greater than the predetermined number of chips. However, by using the propagation-delay-adjusted time reference, the spread spectrum signal may have an apparent phase at the mobile station that is within the predetermined range of the target PN offset, for example, as illustrated in FIG. 1B.

Figure 4:
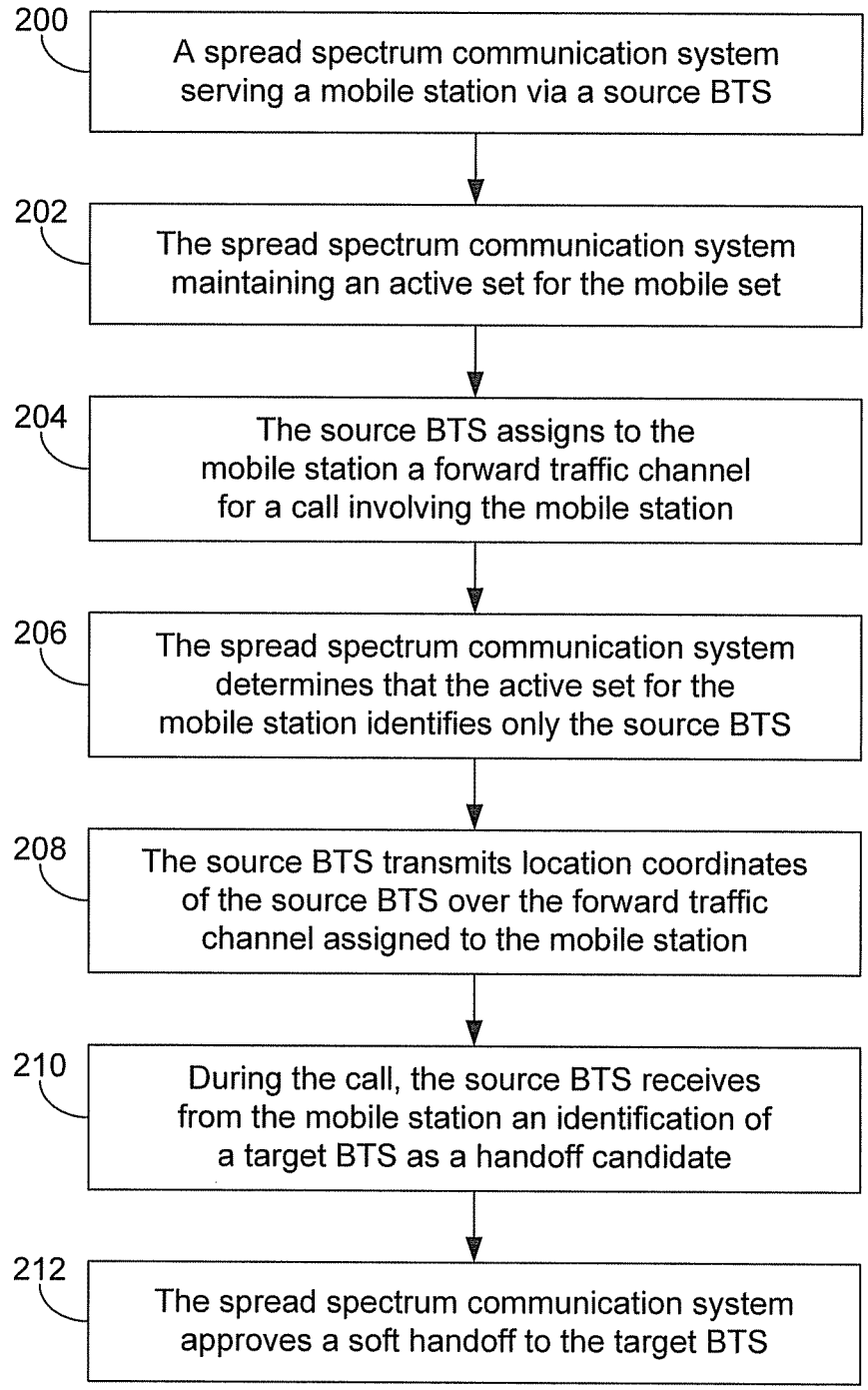
FIG. 4 is a flow chart illustrating a method for a spread spectrum communication system, in accordance with an exemplary embodiment.

FIG. 4 is a flow chart illustrating an exemplary method for a spread spectrum communication system. The method of FIG. 4 could, for example, be used in conjunction with the method of FIG. 3. For purposes of illustration, the method of FIG. 4 will be discussed with reference to spread spectrum communication system 10 shown in FIG. 2. It is to be understood, however, that other configurations could be used.

The method of FIG. 4 begins with a spread spectrum communication system (e.g., system 10) serving a mobile station (e.g., mobile station 18) via a source BTS (e.g., BTS 14), as indicated by block 200. This serving state may come about in several stages. For example, the mobile station may find that the strongest pilot signal that it receives is a pilot signal transmitted by the source BTS. The mobile station may then receive system time information that the source BTS transmits over a sync channel in order to synchronize its time with the system time. In this example, it will be assumed that the source BTS is relatively distant from the mobile station, such that the system time information experiences a significant propagation delay (e.g., 64 chips or more) as it propagates from the source BTS to the mobile station. Nonetheless, the mobile station sets its time reference based on the system time information, begins monitoring a paging channel, and registers with the spread spectrum communication system via the source BTS.

While serving the mobile station, the source BTS transmits overhead messages, such as a neighbor list message. The neighbor list identifies PN offsets corresponding to other BTSs in the spread spectrum communication system. With the source BTS being relatively distant from the mobile station in this example, some of the BTSs identified in the neighbor list may be closer to the mobile station than the source BTS. Such BTSs may have apparent PN offsets at the mobile station that differ from their nominal PN offsets because of the significant propagation delay associated with the system time information that the mobile station received from the source BTS. For example, the neighbor list may identify PN 4, which may appear to the mobile station as PN 3, as described above for FIG. 1A. In this case, however, the mobile station does not compensate for the propagation delay until it is involved in a call and receives location information from the source BTS.

The spread spectrum communication system maintains an active set for the mobile station, as indicated by block 202. The active set identifies any BTSs in the spread spectrum communication system that have forward traffic channels assigned to the mobile station. The active set may identify BTSs (or sectors of BTSs) by their PN offsets. The number of PN offsets in the mobile station's active set may represent the number of BTSs (or sectors) that are being used for a call involving the mobile station. Thus, if the mobile station's active set includes two or more PN offsets, then the mobile station is involved in a soft handoff for a call. The mobile station's active set could be maintained by a BSC (e.g., BSC 26) or other network element in the spread spectrum communication system.

At some point, the source BTS assigns to the mobile station a forward traffic channel for a call involving the mobile station, as indicated by block 204. The call could be a call that the mobile station originated. Alternatively, the call could be a call to the mobile station.

The spread spectrum communication system also checks the mobile station's active set. In this example, the spread spectrum communication determines that the active set for the mobile station identifies only the source BTS, as indicated by block 206. Thus, the spread spectrum communication system determines that the mobile station is not involved in a soft handoff for the call. The spread spectrum communication system may also determine that the source BTS is an "overshooting" BTS.

In response, the source BTS transmits its location coordinates over the forward traffic channel assigned to the mobile station, as indicted by block 208. When the mobile station receives the location coordinates from the source BTS, the mobile station may estimate its distance to the source BTS, calculate a propagation delay based on the estimated distance, and adjust its time reference based on the calculated propagation delay to develop a propagation-delay-adjusted time reference (e.g., as described above for FIG. 3).

While involved in the call, the mobile station may search for pilot signals with PN offsets identified in a neighbor list that it received from the source BTS. By using a propagation-delay-adjusted time reference, the mobile station may be more likely to find and properly identify the PN offsets in the neighbor list. If the mobile station finds a pilot signal with sufficient signal strength from a target BTS in the neighbor list, the mobile station may report the target BTS as a handoff candidate to the spread spectrum communication system. For example, the mobile station may transmit a Pilot Strength Measurement Message (PSMM) that identifies the PN offset of the target BTS.

Thus, at some point during the call, the source BTS may receive from the mobile station an identification of a target BTS as a handoff candidate, as indicated by block 210. If the spread spectrum communication system recognizes the target BTS as a valid neighboring BTS, then the spread spectrum communication system may approve a soft handoff to the target BTS, as indicated by block 212. This may involve the target BTS assigning a forward traffic channel for the call and the source BTS transmitting to the mobile station a Handoff Direction Message (HDM) that identifies the forward traffic channel assigned by the target BTS. In this way, the mobile station may continue the call using both the source BTS and the target BTS. With a soft handoff now being used the call, the call is less likely to be dropped.

4. Exemplary Mobile Station

Figure 5:
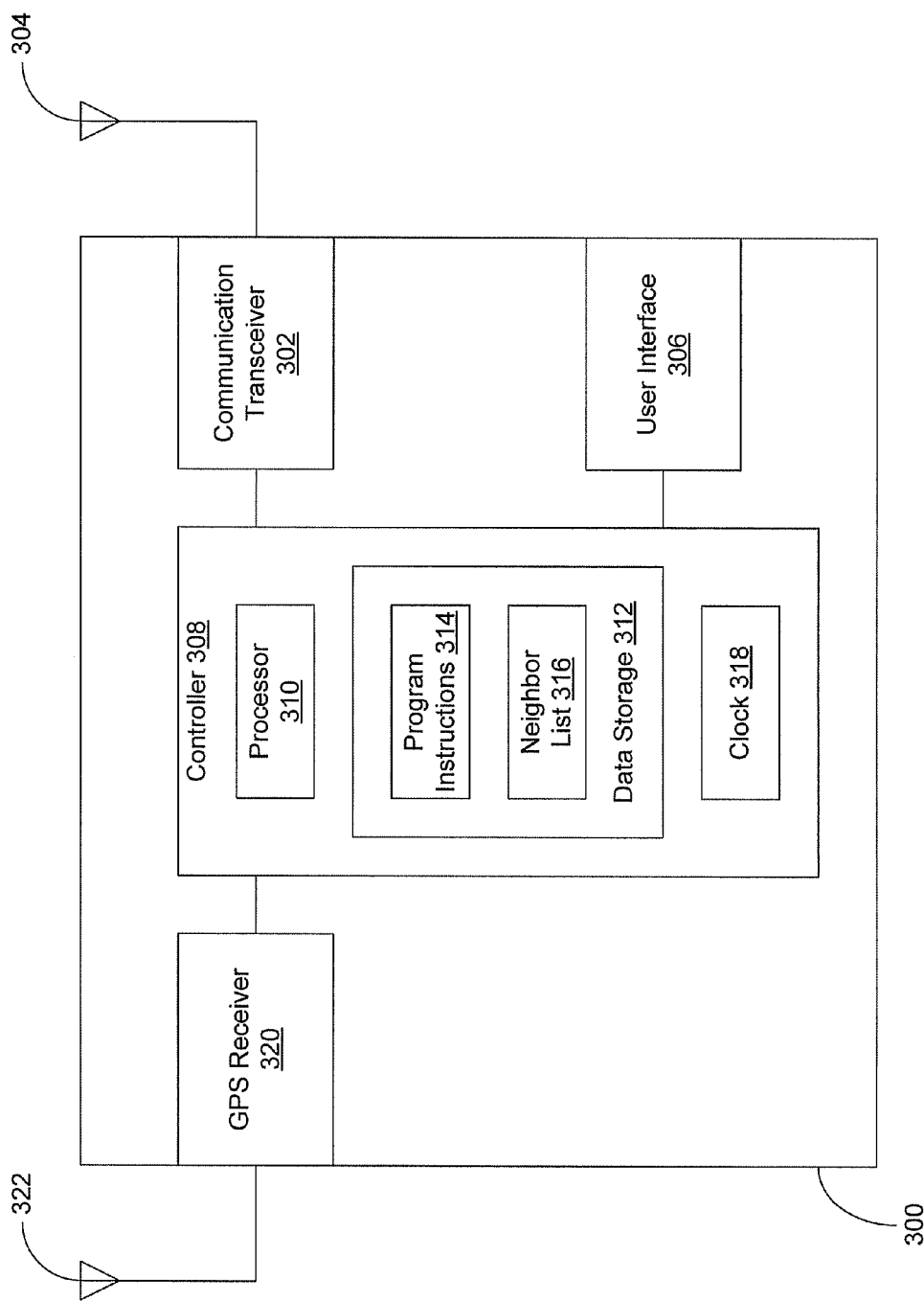
FIG. 5 is a block diagram of a mobile station, in accordance with an exemplary embodiment.

FIG. 5 illustrates an exemplary mobile station 300 that can operate in accordance with the methods described above. Mobile Station 300 includes a communication transceiver 302 for communicating with one or more BTSs in a spread spectrum communication system via an antenna 304. More particularly, communication transceiver 302 may function as a transmitter for transmitting spread spectrum signals to one or more BTSs and may function as a receiver for receiving spread spectrum signals transmitted by one or more BTSs.

Mobile station 300 also includes a user interface 306 for obtaining input from a user of mobile station 300 and for conveying information to user. Thus, user interface 306 may include a keypad, touch screen, or other controls by which the user may provide input into mobile station 300. User interface 306 may also include a display for displaying textual, graphical, or other visual information to the user. Mobile station 300 may also be configured for voice communication. User interface 306 may include a microphone for receiving audio input from the user and a speaker for conveying audio to the user. Alternatively, mobile station 300 may communicate with an external microphone and/or speaker, for example, via a wireless connection.

The functioning of mobile station 300 may be controlled by a controller 308 that is coupled to communication transceiver 302 and to user interface 306. Controller 308 may comprise a processor 310 and data storage 312. Data storage 312 may include any type of non-transitory computer readable media, for example, random access memory (RAM), read only memory (ROM), cache memory, flash memory, one or more magnetically-encoded disks, and/or one or more optically-encoded disks. Data storage 312 may store program instructions 314 that are executable by processor 310 to control the functioning of mobile station 300. Data storage 312 may also store other information, such as a neighbor list 316 transmitted by the source BTS.

Program instructions 314 may be executable by processor 310 so as to cause mobile station 300 to perform any of the functions illustrated in FIG. 3 and described above. Thus, program instructions 314 may be executable by processor 310 to perform the functions of: (a) receiving, through communication transceiver 302, system time information transmitted by a source BTS; (b) estimating a distance between mobile station 300 and the source BTS; (c) calculating a propagation delay based on the estimated distance; (d) developing a propagation-delay-adjusted time reference based on the system time information transmitted by the source BTS and the calculated propagation delay; (e) receiving, through communication transceiver 302, a neighbor list transmitted by the source BTS, wherein the neighbor list identifies PN offsets corresponding to other BTSs in the spread spectrum communication system; (f) selecting from the neighbor list a target PN offset that corresponds to a target BTS; and (g) using communication transceiver 302 to search for a spread spectrum signal having a phase at mobile station 300 that is within a predetermined number of chips of a target PN offset according to the propagation-delay-adjusted time reference. In the case of an "overshooting" source BTS, the calculated propagation delay may be greater than the predetermined number of chips.

The time reference may be developed using an internal clock 318. For example, every even second according to internal clock 318 may be used as a reference time for determination of PN offsets. Internal clock 318 may initially be synchronized to the system time information received from the source BTS. However, internal clock 318 may also be reset based on the calculated propagation delay, for example, by shifting the time indicated by internal clock 318 forward by an amount corresponding to the calculated propagation delay. In this way, a propagation-delay-adjusted time reference may be developed.

In some embodiments, mobile station 300 may be configured to estimate the distance to the source BTS based on location information. For example, mobile station 300 may receive, through communication transceiver 302, a location of the source BTS (e.g., location coordinates transmitted by the source BTS). Mobile station 300 may also be able to determine its location, for example, based on signals received from a satellite-based positioning system. Thus, mobile station 300 may include a GPS receiver 320 for receiving GPS signals via an antenna 322. The distance between mobile station 300 and the source BTS may then be estimated based on the location of the source BTS and the location of mobile station 300.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
  a mobile station receiving system time information from a source base transceiver station (BTS) in a spread spectrum communication system;
  said mobile station estimating a distance between said mobile station and said source BTS;
  said mobile station identifying a PN offset for a pilot signal transmitted by a target BTS;
  said mobile station calculating a propagation delay based on said estimated distance;
  said mobile station developing a propagation-delay-adjusted time reference based on said system time information and said calculated propagation delay; and
  said mobile station searching for said target BTS in said spread spectrum communication system at said PN offset measured from said propagation-delay-adjusted time reference.

2. The method of claim 1, wherein said mobile station receiving said system time information from said source BTS comprises said mobile station receiving a sync channel message transmitted by said source BTS.

3. The method of claim 1, wherein said mobile station estimating said distance between said mobile station and said source BTS comprises:
  said mobile station determining a location of said source BTS;
  said mobile station determining a location of said mobile station; and said mobile station estimating said distance between said mobile station and said source BTS based on said location of said source BTS and said location of said mobile station, 4. The method of claim 3, wherein said mobile station determining said location of said source BTS comprises said mobile station receiving location coordinates of said source BTS.

5. The method of claim 4, wherein said mobile station receiving said location coordinates of said source BTS comprises said mobile station receiving said location coordinates of said source BTS over a forward traffic channel of said source BTS.

6. The method of claim 3, wherein said mobile station determining said location of said mobile station comprises said mobile station determining said location of said mobile station using a satellite-based positioning system.

7. The method of claim 1, wherein said mobile station developing said propagation-delay-adjusted time reference based on said system time information and said calculated propagation delay comprises:
   said mobile station developing a time reference based on said system time information; and
   after estimating said distance between said mobile station and said source BTS and calculating said propagation delay based on said estimated distance, said mobile station adjusting said time reference based on said calculated propagation delay to develop said propagation-delay-adjusted time reference.

8. The mobile station of claim 1, wherein said calculated propagation delay is greater than a predetermined number of chips.

9. The method of claim 8, wherein said target BTS in said spread spectrum communication system is closer to said mobile station than said source BTS.

10. A method, comprising:
   a spread spectrum communication system serving a mobile station via a source base transceiver station(BTS), wherein said spread spectrum communication system comprises a plurality of BTSs;
   said spread spectrum communication system maintaining an active set for said mobile station, wherein said active set identifies any BTSs in said spread spectrum communication system that have forward traffic channels assigned to said mobile station; said source BTS assigning to said mobile station a forward traffic channel for a call involving said mobile station;
   determining that said active set for said mobile station identifies only said source BTS; and
   in response to determining that said active set for said mobile station identifies only said source BTS, said source BTS transmitting location coordinates of said source BTS over said forward traffic channel assigned to said mobile station.

11. The method of claim 10, further comprising:
   said source BTS transmitting system time information over a sync channel.

12. The method of claim 11, wherein said source BTS has a PN offset that is an integral multiple of 64 chips.

13. The method of claim 12, wherein said mobile station is located a distance from said source BTS such that said system time information experiences a propagation delay of at least 64 chips when propagating from said source BTS to said mobile station.

14. The method of claim 10, further comprising:
   said source BTS transmitting a neighbor list to said mobile station, wherein said neighbor list identifies at least one BTS that is closer to said mobile station than said source BTS.

15. A mobile station, comprising:
   a transceiver for wireless communication with a spread spectrum communication system;
   a processor;
   data storage;
   program instructions stored in said data storage and executable by said processor to cause said mobile station to perform functions comprising:
      (a) receiving, through said transceiver, system time information transmitted by a source base transceiver station (BTS) in said spread spectrum communication system;
      (b) estimating a distance between said mobile station and said source BTS;
      (c) calculating a propagation delay based on said estimated distance;
      (d) developing a propagation-delay-adjusted time reference based on said system time information transmitted by said source BTS and said calculated propagation delay; and
      (e) identifying a PN offset for a pilot signal transmitted by a target BTS; and
      (f) searching for said target BTS at the PN offset measured from said propagation-delay-adjusted time reference.

16. The mobile station of claim 15, wherein said calculated propagation delay is greater than a predetermined number of chips.

17. The mobile station of claim 15, wherein estimating said distance between said mobile station and said source BTS comprises:
   receiving, through said transceiver, a location of said source BTS;
   using a GPS receiver to determine a location of said mobile station; and estimating said distance based on said location of said source BTS and said location of said mobile station.

* * * * *